Feb. 25, 1947. H. T. WROBEL 2,416,604
PHOTOELECTRIC CELL
Filed Dec. 8, 1945
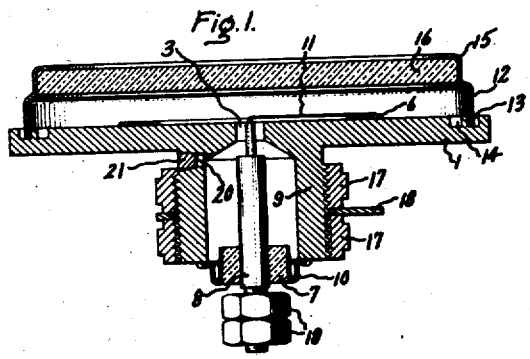
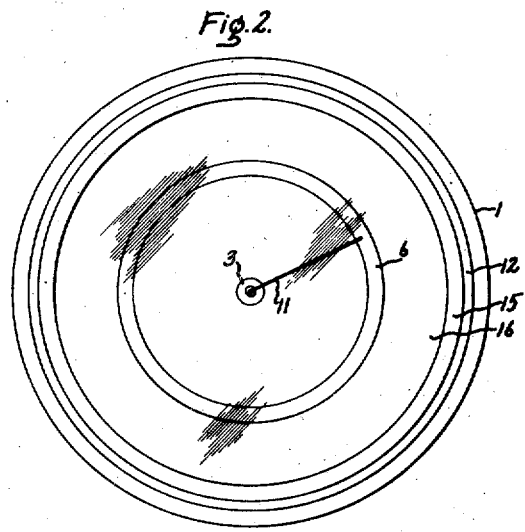
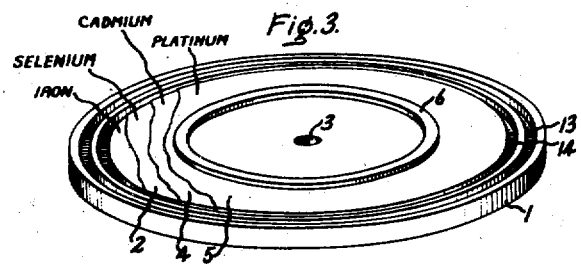
Inventor:
Henry T. Wrobel,
by Harry E. Dunham
His Attorney.

Patented Feb. 25, 1947

2,416,604

UNITED STATES PATENT OFFICE 2,416,604

PHOTOELECTRIC CELL

Henry T. Wrobel, Lynn, Mass., assignor to General Electric Company, a corporation of New York Application December 8, 1945, Serial No. 633,836

4 Claims. (Cl. 201—63)

1

The present invention is an improvement in photoelectric cells; and it is the object of my invention to provide a hermetically sealed structure which will be rugged and compact, and completely protected against environmental influences, such as the entry of moisture, fungus, and deleterious vapors or gases.

In accordance with my present invention, I have provided strong, compact, hermetically enclosed photoelectric devices of structural simplicity. In such devices a metal plate forming the base of a photoelectric cell constitutes part of the sealing enclosure. This metal base plate is provided with a perforation containing a sealed-in plug of vitreous material through which passes one of the conductors leading to the photoelectric element. A sealed photoelectric device embodying my invention is described in the following specification and is shown in the accompanying drawing.

In the drawing, Fig. 1 is a vertical section of a hermetically sealed cell embodying my invention; Fig. 2 is a top view; and Fig. 3 is a perspective view showing the base construction.

In the construction of the cell, the base plate 1, which may consist of iron, nickel, or other suitable metal, is provided with a thin layer 2 (Fig. 3) of photosensitive material, as, for example, a coating of selenium, by a method described in Hewlett Patent 2,296,670. The base plate is provided with an opening 3, as shown in the drawing. After appropriate heat treatment (described in this patent) whereby the selenium layer 2 is converted into a light-sensitive state, thin films 4, 5 consisting respectively of cadmium and platinum are successively superimposed on the selenium layer. These metal layers 4, 5 which are thin enough to be capable of transmitting light to the photosensitive material serve as a current-conveying electrode. A contact ring 6 of cadmium (shown of somewhat exaggerated thickness in Fig. 3) is superimposed on the layer 5 by any suitable method, for example by spray deposition, or by a Schoop gun. A thin layer of lacquer (not shown) is applied over the platinum film 5. The lacquer layer improves the output of the cell.

In a plug 7 of glass is embedded a sealed-in metal conductor 8. The glass is hermetically joined to the rim of a tubular extension 9 of the base plate. For example, the glass may be fusion-sealed to a U-shaped annular sealing eyelet 10. The inner flange of the eyelet 10 is joined to the glass plug 7 and the outer flange is joined by soldering or welding to the tubular extension 9

2 of the base plate 1. The fusion-sealed glass and metal parts are chosen to have substantially the same coefficients of thermal expansion. A conductor 11 is connected, as by soldering, to the conductor 8 and the contact ring 6.

In the assembly of the component parts it is necessary to keep the temperature of the selenium film below approximately 100° C., except for a short time application of an elevated temperature. This result can be attained by carrying heat away from the cell elements during heating steps by conduction to an adjacent cooler mass of metal or the like. Rapid localized heating can be effected also by inductive electric heating. For example, a flanged ring 12 is joined at its lower edge to the support 1 by soldering, the solder metal filling the outer peripheral channel 13 on the base plate 1. Flow of heat from the fused solder to the selenium is reduced by an inner channel 14. The upper, inwardly bent flange 15 of the ring 12 is sealed to a glass cover plate 16. The glass and the metal flange are chosen to have substantially the same coefficients of thermal expansion.

The tubular extension 9 is externally screw-threaded and provided with binding nuts 17, as shown on the drawing, to permit attaching the photoelectric device to a support or electric terminal which is indicated at 18. Contact may be made by screwing the threaded extension into a threaded member (not shown). An electrical connection between a conductor (not shown) and the terminal of the conductor 8 can be made by the binding nuts 19.

The space within the sealed envelope constituted by the described members may be evacuated through an opening at 20 (Fig. 1). The opening 20 may be suitably sealed after evacuation. The space within the photoelectric device after evacuation may be filled with a suitable gas, or mixture of gases. A plug 21 sealing the opening has been conventionally indicated.

What I claim as new and desire to secure by Letters Patent of the United States is:

1. A sealed photoelectric cell comprising a metal base plate having an opening extending therethrough, and being provided with a photosensitive surface, means for making electrical contact with said photosensitive surface, a closure of sealing material for the opening in said base plate, a cover of radiation-transmitting material mounted above said photosensitive surface, means for sealing the edge of said cover to said base plate, an electrical conductor passing through said sealing material and electrically joined to said contact-making means.

2. A sealed photoelectric cell comprising a metal base plate having an opening extending therethrough, a layer of selenium on said plate, a light-transmitting metal coating superimposed on the selenium, a closure comprising a sealing plug of insulating material externally closing the opening in said base plate, a conductor embedded in said sealing plug, a radiation-transmitting window mounted over said selenium-covered base plate, means for hermetically sealing the edge of said window to said base plate, and means for electrically connecting said embedded conductor and said light-transmitting coating, and external electric terminals for said base plate and said embedded conductor.

3. A hermetically sealed photoelectric cell comprising a metal base plate having a perforation extending therethrough, a layer of selenium applied to the surface of said plate, a light-transmitting, metallic coating superimposed over said selenium layer, a metallic flange joined to the edge of said base plate and extending above said layer of selenium, a cover of transparent material fusion-sealed to the edge of said flange and enclosing said coated selenium layer, a plug of vitreous material fusion-sealed in said perforation and a conductor hermetically sealed in said plug and extending therethrough into electrical contact with the metallic coating on said selenium layer.

4. A hermetically sealed photoelectric cell comprising a metal base plate having an opening extending therethrough, a layer of selenium on said plate, peripheral channels adjacent to one another and to the edge of said plate, means for making electrical contact with said selenium layer, a plug of vitreous material sealing the opening in said base plate, a conductor sealed into said plug and joined to the contacting means for said selenium, a window of radiation-transmitting material mounted above the selenium layer and sealed in the outermost peripheral channel, and external electric contacts for said base plate and said sealed-in conductor for the selenium layer.

HENRY T. WROBEL.